(12) United States Patent
Xu et al.

(10) Patent No.: US 9,667,063 B1
(45) Date of Patent: May 30, 2017

(54) HARMONIC FILTER FOR MULTIPULSE CONVERTER SYSTEMS

(71) Applicant: Wilsun Xu, Edmonton (CA)

(72) Inventors: Wilsun Xu, Edmonton (CA); Xin Li, Edmonton (CA)

(73) Assignee: Wilsun Xu, Edmonton, Alberta (CA)

( * ) Notice: Subject to any disclaimer, the term of this patent is extended or adjusted under 35 U.S.C. 154(b) by 0 days.

(21) Appl. No.: 15/048,546

(22) Filed: Feb. 19, 2016

(51) Int. Cl.
*H02J 1/02* (2006.01)
*H02M 1/12* (2006.01)

(52) U.S. Cl.
CPC ............... *H02J 1/02* (2013.01); *H02M 1/126* (2013.01)

(58) Field of Classification Search
CPC .... H02M 1/12–1/126; H02J 3/01; H02J 3/34; H02J 1/01; H02H 3/52; Y02E 40/40
See application file for complete search history.

(56) References Cited

U.S. PATENT DOCUMENTS

| | | | |
|---|---|---|---|
| 3,038,134 A | 6/1962 | Forssell | |
| 3,555,291 A | 1/1971 | Dewey | |
| 3,935,551 A | 1/1976 | Henniger | |
| 4,622,474 A | 11/1986 | Christl et al. | |
| 4,743,873 A | 5/1988 | Schultz et al. | |
| 4,864,484 A * | 9/1989 | Krueger | H02M 1/126 307/105 |
| 5,574,635 A * | 11/1996 | Philippe | H02M 1/4216 363/124 |
| 5,784,236 A * | 7/1998 | Tardiff | H02H 9/04 361/111 |
| 6,075,829 A * | 6/2000 | Hayashi | H03B 5/1203 329/304 |
| 6,114,810 A * | 9/2000 | Foo | H05B 41/295 315/105 |
| 6,278,313 B1 * | 8/2001 | Kakuta | H03F 1/301 327/317 |
| 7,372,384 B1 * | 5/2008 | Xu | H03M 3/368 341/143 |
| 2002/0105384 A1 * | 8/2002 | Dent | H01P 1/212 330/302 |
| 2012/0182089 A1 | 7/2012 | Liang et al. | |

OTHER PUBLICATIONS

Siemens "Harmonics in Power Systems". May 2013. pp. 1-24.*
Screen shot from: Direct Current Transmission; Design of High-Pass Damped Filters; Kimbark 1971; p. 375 and 377.
"Screen shot from: AC Harmonic Filters and Reactive Compensation for HVDC With Particular Reference to Noncharacteristic Harmonies" Cigre Working Group, 1990; p. 18.

(Continued)

*Primary Examiner* — Harry Behm
*Assistant Examiner* — Peter Novak
(74) *Attorney, Agent, or Firm* — Anthony R. Lambert

(57) ABSTRACT

An improved scheme to filter harmonics and damp resonance for multipulse converter systems using a single characteristic passive filter branch without a plurality of non-characteristic harmonic filters is disclosed. The filter includes a first capacitor, a first inductor and a frequency-dependent resistor block connected in series. The frequency-dependent resistor block includes a second inductor connected in parallel with a circuit which is assembled by a second capacitor in series with a resistor.

11 Claims, 5 Drawing Sheets

(56) References Cited

OTHER PUBLICATIONS

"Screen shot from: AC Harmonic Filters and Reactive Compensation for HVDC With Particular Reference to Noncharacteristic Harmonies" Cigre Working Group, 1990; p. 34.
Kiao Yao; Algorithm for the Parameters of Double Tuned Filter; 1998; IEEE; p. 154-157.
Screen shot from: Direct Current Transmission; Double Tuned Filters; Kimbark 1971; p. 363 and 364.
"Screen shot from: AC Harmonic Filters and Reactive Compensation for HVDC With Particular Reference to Noncharacteristic Harmonies" Cigre Working Group, 1990; p. 32.
"Screen shot from: AC Harmonic Filters and Reactive Compensation for HVDC With Particular Reference to Noncharacteristic Harmonies" Cigre Working Group, 1990; p. 26.
Tianyu Ding et al: Design Method for 3rd Order High-Pass Filter; 2015; IEEE Transactions on Power Delivery; p. 1-2.

\* cited by examiner

HARMONIC FILTER FOR MULTIPULSE CONVERTER SYSTEMS

FIELD

Harmonic filtering in electric power.

BACKGROUND

AC to DC converters are widely employed in high-voltage direct current (HVDC) transmission schemes, variable frequency drives, and other energy conversion devices. The converters convert AC power into DC power. This conversion process leads to the distortion of the waveform of the current entering a converter, which can also be regarded as that the converter generates harmonic currents.

In order to reduce the harmonic currents produced by the converter systems, various passive harmonic filters have been disclosed. For example, U.S. Pat. No. 4,622,474 revealed a high pass filter scheme that can sink high order characteristic harmonics such as the $11^{th}$, $13^{th}$. The filter package disclosed in U.S. Pat. No. 3,038,134 combines the double-tuned filter and high-pass filter to filter the $5^{th}$, $7^{th}$ and higher order harmonics. The most common filtering scheme consists of a set of filter braches grouped as a filter package. Each filter branch provides a low impedance path for a harmonic current, which can also be called as that the filter branch is tuned to the harmonic. For example, filters tuned to the $5^{th}$, $7^{th}$, and $11^{th}$ harmonics are used to form a filter package typical a 6-pulse converter system.

The basic configuration of a common converter is a six-pulse bridge circuit as shown in FIG. 1 141. This circuit produces $5^{th}$, $7^{th}$, $11^{th}$ and $13^{th}$ . . . harmonic currents even under ideal conditions, i.e. in theory. As such, the harmonics are called characteristic harmonics. By connecting multiple six-pulse blocks in parallel, multipulse converter systems can be constructed (Derek A. Paice, Power Electronic Converter Harmonics—Multipulse Methods for Clean Power, Wiley-IEEE Press, 1995, pp. 147-165.). For example, a 12-pulse converter can be formed using two six-pulse bridge circuits. The main advantage of a multipulse configuration is the reduced generation of harmonics, thereby reducing the requirements on harmonic filters. Under ideal operating conditions, the harmonic currents produced by a p-pulse converter system only contains kp±1 order harmonics, where k=1, 2, 3 . . . . For example, a 12-pulse system in theory only produces $11^{th}$, $13^{th}$, $23^{rd}$, $25^{th}$ . . . harmonic currents and a 18-pulse system in theory only produces $17^{th}$, $19^{th}$, $35^{th}$, $37^{th}$ . . . harmonic currents. These are the characteristic harmonics of a p-pulse converter system. All other order harmonics such as the $3^{rd}$, $5^{th}$, $7^{th}$, $9^{th}$ harmonics for a 12-pulse system, or $3^{rd}$, $5^{th}$, $7^{th}$, $9^{th}$, $11^{th}$ and $13^{th}$ for a 18-pulse system, are denoted as the non-characteristic harmonics. Non-characteristic harmonics are generated under non-ideal operating conditions such as when the three-phase voltages supplying the converter are slightly unbalanced. But the non-characteristic harmonics are generally very small.

Since a multipulse converter produces very small amount of non-characteristic harmonics, its filter package, in theory, does not really need filter branches that are tuned to the $5^{th}$, $7^{th}$ and other non-characteristic harmonics. However, the industry practice still applies filters to filter non-characteristic harmonics. This is due to the following issue. A passive filter branch is capacitive below its tuning frequency. The capacitance interacts with the supply system impedance (which is normally inductive), leading to resonance at a frequency below the filter's tuning frequency. If the resonance frequency coincides with one of the harmonic frequencies such as the $7^{th}$ harmonic frequency, significant amplification of the non-characteristic $7^{th}$ harmonic can occur.

The resonance issue has made the filtering schemes for multipulse systems a lot more complex and costly. For example, a 12-pulse HVDC terminal or variable frequency drive generates only a small amount of non-characteristic 5th and 7th harmonics. The primary objective of its filter package should be the reduction of the 11th, 13th and higher order characteristic harmonics. However, an 11th filter branch can create a resonance around the 7th harmonic. As a result, a small non-characteristic 7th filter is needed, which in turn requires the installation of a 5th non-characteristic filter. The main advantage of a 12-pulse system, reduced 5th and 7th harmonic generation, is therefore not fully utilized.

In addition to increasing the component costs of the filter package, the non-characteristic filters also increase the space requirement. This can be a significant issue for variable frequency drive applications. The reliability of the system is also reduced since a malfunction of one non-characteristic filter can lead to the shutdown of the entire system through an interlock mechanism (US 2012/0182089 A1). Moreover, there are still resonance points between the filter tuning frequencies. If the converter system generates interharmonics which are "harmonic" components whose frequencies are not an integer multiples of the fundamental frequency, the resonance points can easily amplify the interharmonics, leading to problems such as voltage flicker or interference with power line carrier systems. In fact, how to mitigate interharmonic amplification for such a filter package is still an open question.

In order to overcome the abovementioned problems, U.S. Pat. No. 3,935,551 and U.S. Pat. No. 3,555,291 present methods to eliminate resonance by adding one single damped-type non-characteristic filter tuning below the lowest non-characteristic harmonic frequency (for example: below the $5^{th}$ harmonic frequency for a 12-pulse system) instead of a plurality of filter branches. U.S. Pat. No. 4,743,873 and U.S. Pat. No. 4,864,484 proposed filter configurations with damping resistor to limit the resonance peaks. However, the resonance issue has not been solved satisfactorily by these works.

SUMMARY

In an embodiment, there is provided a filter for a multipulse converter system that has characteristic harmonic currents and causes non-characteristic harmonic resonance, the filter comprising: a first series capacitor, a first series inductor, a frequency-dependent resistor block providing high equivalent resistance for damping non-characteristic harmonic resonance, including a second capacitor in series with a resistor and a second inductor; and the first series capacitor, first series inductor and the frequency-dependent resistor block being jointly tuned to filter the characteristic harmonic currents.

In a further embodiment, there is provided a method for filtering harmonic currents generated by a multipulse converter system comprising providing a first series capacitor, a first series inductor and a frequency-dependent resistor block, the frequency-dependent resistor block including a second capacitor in series with a resistor and a second inductor; damping non-characteristic harmonic resonance of the multipulse converter system by the frequency-dependent resistor block providing high equivalent resistance for noncharacteristic harmonic resonance; and filtering the characteristic harmonic currents by the first series capacitor, first series inductor and the frequency-dependent resistor block being jointly tuned to filter the characteristic harmonic currents.

In further embodiments, the characteristic harmonic currents comprises the $11^{th}$ harmonic or higher; and the non-characteristic harmonic comprises the $3^{rd}$, $5^{th}$ and $7^{th}$ harmonics etc.

BRIEF DESCRIPTION OF THE DRAWINGS

Embodiments of a filter will now be explained in further detail with reference to the accompanying figures, by way of example, wherein.

DETAILED DESCRIPTION

Figure 1:
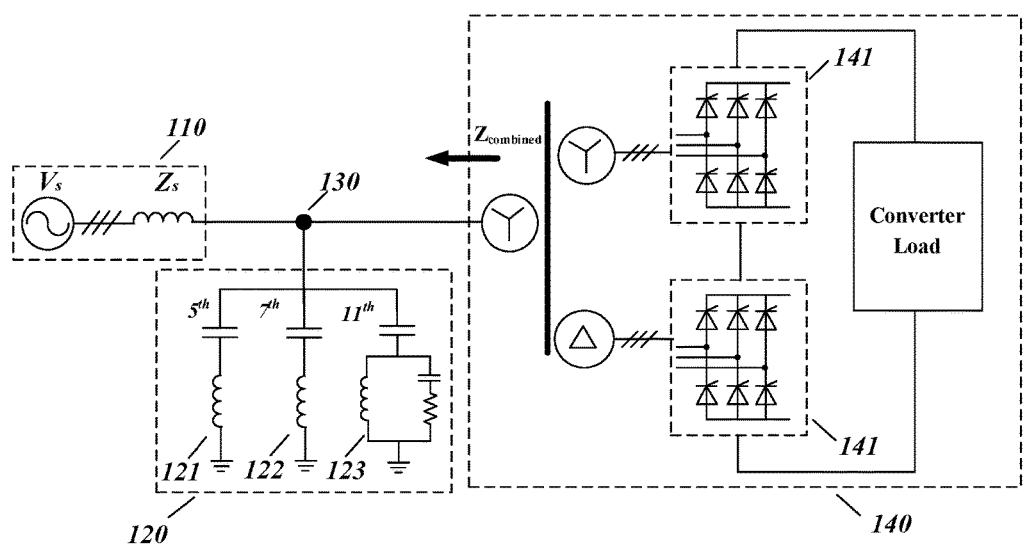
FIG. 1 is an example of existing filtering scheme for a 12-pulse system known.

FIG. 1 shows the filtering scheme commonly used for filtering harmonic currents generated by a 12-pulse converter system 140. The filter package 120 is connected at the interconnection point 130 between the supply system 110 and the 12-pulse converter 140, which is composed by a plurality of filter branches 121, 122 and 123. The filter branch 123 is composed by a main capacitor together with a shunt circuit including an inductor parallel with a second capacitor and a resistor. It serves as the characteristic filter to sink the characteristic harmonic currents, such as the $11^{th}$, $13^{th}$ $23^{rd}$ and $25^{th}$ harmonics for a 12-pulse system. This branch is tuned to the $11^{th}$ harmonic. In some literatures, there are also other configuration variations for the filter branch 123 (IEEE Standard 1531™-2003, IEEE Guide for Application and Specification of Harmonic Filters, November 2003, pp. 57-57). The filter branches 121 and 122, composing of a series connected capacitor and inductor circuit, serve as the non-characteristic filters to suppress potential resonance at non-characteristic harmonic frequencies, namely, the $5^{th}$ and $7^{th}$ harmonic frequencies for a 12-pulse system.

Figure 2:
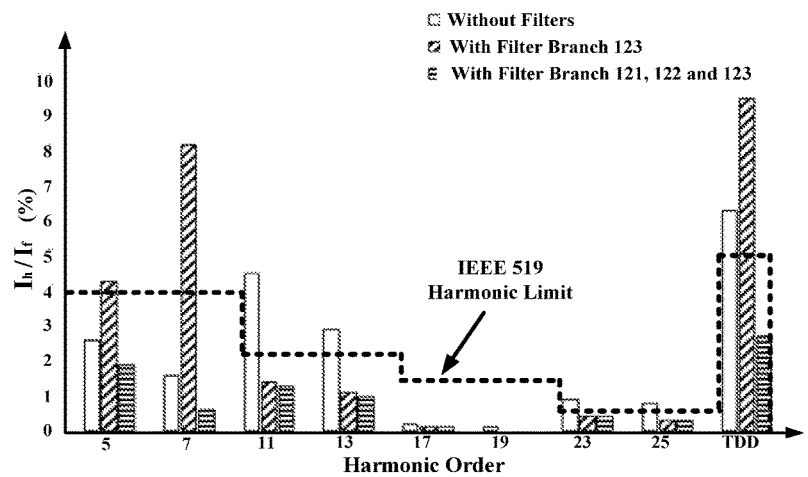
FIG. 2 is an example of harmonic distortions in a 12-pulse system for different filter configurations.

Now tuning to FIG. 2 which illustrates an example of harmonic distortions in a 12-pulse converter system with different filtering options. The amount of each harmonic current is presented as a percentage value with respect to the fundamental frequency current. Case "Without Filters" shows that the non-characteristic harmonics ($5^{th}$ and $7^{th}$ harmonics) of the 12-pulse system are able to meet the harmonic limits even without any filter branch. But the $11^{th}$, $13^{th}$, $23^{rd}$ and $25^{th}$ characteristic harmonics exceed the limits. Therefore, the filtering objective should be the reduction of the characteristic harmonics. However, if only the characteristic filter branch 123 is applied, the low-frequency non-characteristic harmonics are significantly amplified and will exceed the limits due to the abovementioned resonance phenomenon. In accordance to this condition, non-characteristic filter branch 121 and 122 must be inserted to reduce the non-characteristic harmonics.

Figure 3:
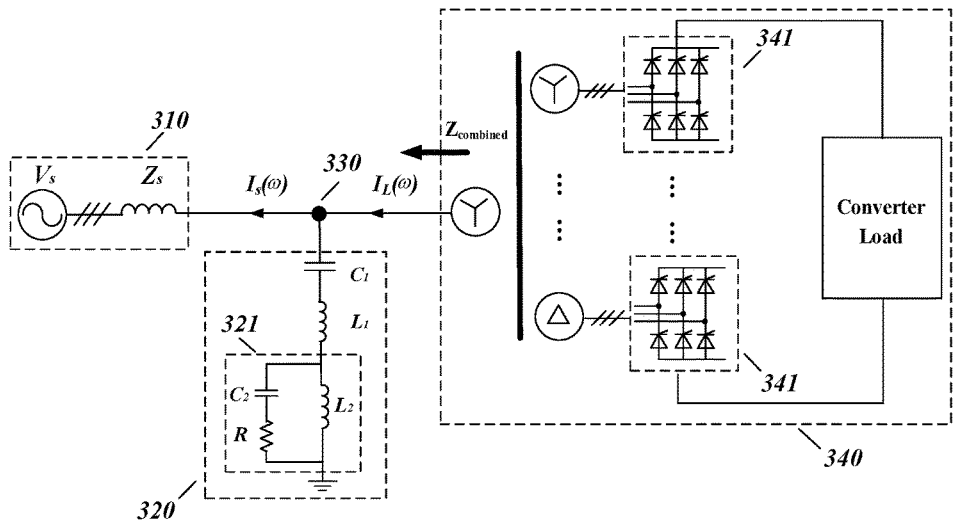
FIG. 3 discloses an embodiment of the disclosed filter.

Referring to FIG. 3 the single filter branch 320 is applied at the interconnection point 330 between the supply system 310 and the multipulse converter system 340 to replace the conventional filter package 120 illustrated in FIG. 1. The filter branch 320 is composed of the first capacitor $C_1$ and inductor $L_1$ in series with a frequency-dependent resistor block 321. The frequency-dependent resistor block 321 is a shunt circuit which includes a second capacitor $C_2$ and damping resistor R together connecting in parallel with a second inductor $L_2$.

Figure 4:
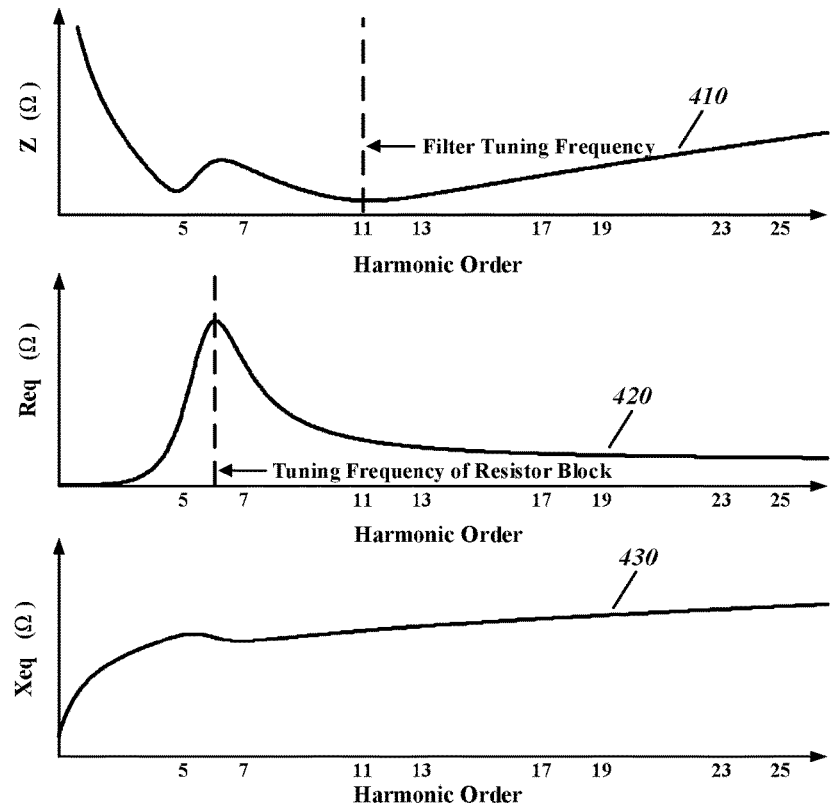
FIG. 4 shows the frequency response diagram of the disclosed configuration, including filter impedance Z, filter equivalent resistance $R_{eq}$ and filter equivalent reactance $X_{eq}$.

The frequency-dependent resistor block 321 can yield a different total resistance at different frequencies. If capacitor $C_2$ is selected to resonate with $L_2$ at, say, a frequency close or equal to the $6^{th}$ harmonic, the resistor block will exhibit a large resistance component at the $5^{th}$ harmonic and $7^{th}$ harmonic. Since a resistor damps resonance, the large resistance produced by the resistor block 321 creates a significant damping effect at the $5^{th}$ and $7^{th}$ harmonics. Consequently, the resonance at the $5^{th}$ and $7^{th}$ non-characteristic harmonics caused by the filter elements $C_1$ and $L_1$ is suppressed. Since the resonance has been suppressed, filter branches such as 121 and 122 shown in FIG. 1 are no longer needed for mitigating the non-characteristic harmonics. The above phenomenon can be seen from FIG. 4. This figure shows the frequency response of the entire filter branch 320, i.e. its equivalent impedance 410, resistance 420, reactance 430 as a function of frequency (expressed as harmonic number). A high resistance around the $5^{th}$ and $7^{th}$ harmonic can be seen. The double-tuned filters described in Reference (E. W. Kimbark, Direct Current Transmission, Wiley-interscience, 1971, pp. 363-364.) and U.S. Pat. No. 3,038,134 are not able to produce the damping effect for non-characteristic harmonics, as its goal is to filter two characteristic harmonics using one filter branch.

A design method embodies the above principles for the disclosed filter is explained below.

Referring back to FIG. 3, the impedance of the disclosed filter 320 can be expressed as $$Z(\omega) = \frac{j\omega L(j\omega C_2 R + 1)}{(1 - \omega^2 C_2 R) + j\omega C_2 R} - j\frac{1}{\omega C_1} + j\omega L_1 = R_{eq}(\omega) + jX_{eq}(\omega) \quad (1)$$

where $$R_{eq}(\omega) = \frac{\omega^4 R L_2^2 C_2^2}{(\omega R C_2)^2 + (\omega^2 L_2 C_2 - 1)^2} \quad (2)$$

$$X_{eq}(\omega) = \frac{\omega L_2(1 - \omega^2 L_2 C_2) + \omega^3 R^2 L_2 C_2^2}{(\omega R C_2)^2 + (1 - \omega^2 L_2 C_2)^2} - \frac{1}{\omega C_1} + \omega L_1. \quad (3)$$

Design Condition 1: Reactive Power Support.

The filter reactive power output should be determined based on the system reactive power requirement $Q_C$. This can be used to determine the first series capacitor $C_1$ as shown below $$C_1 = \frac{Q_c}{\omega_0 V_0^2} \quad (4)$$

where $V_0$ is the system nominal voltage and $\omega_0$ is the system fundamental frequency.

Design Condition 2: Filter Tuning Frequency.

The filter tuning frequency $\omega_t$ should be equal to the lowest characteristic harmonic frequency. For example, it is the 11th harmonic for a 12-pulse system or the 17th harmonic for a 18-pulse system. The filter tuning frequency Wt is defined here as the frequency where the reactive component of the filter impedance equals to zero, i.e.

$$X_{eq}(\omega_t) = 0. \quad (5)$$

Design Condition 3: Harmonic Reduction Capability.

The filter should be able to filter the characteristic harmonic it is tuned to. The degree of harmonic reduction is defined as a user input parameter α %, i.e.

$$I_s(\omega_t) = (1 - \alpha \%) I_L(\omega_t) \quad (6)$$

where $I_L(\omega_t)$ is the harmonic current generated by the multipulse converter 340, and $I_s(\omega_t)$ is the harmonic current flowing into the system 310 (referring to FIG. 3).

Design Condition 4: Parallel Resonance Frequency of the Frequency-Dependent Resistor Block.

The parallel resonance of the frequency-dependent resistor block 321 is intended to boost the disclosed filter resistance for the non-characteristic harmonics. Therefore, the resonance frequency $\omega_p$ can be selected to be between the two lowest order non-characteristic harmonics (such as between the $5^{th}$ and the $7^{th}$ harmonics, i.e. the $6^{th}$ harmonic). The parallel resonance frequency $\omega_p$ determines the $C_2$ and $L_2$ relationship as $$C_2 = \frac{1}{\omega_p^2 L_2}. \quad (7)$$

Design Condition 5: Damping Performance of the Non-Characteristic Harmonic Resonance.

The filter must limit the amplification of non-characteristic harmonics. This is achieved by minimizing the worst case harmonic amplification factor ($HAR_{worst}$) as illustrated in (8). This factor presents the worst case voltage amplification ratio at a specific harmonic frequency after filter connection.

$$\min\left\{ HAR_{worst}(\omega) = \sqrt{1 + \frac{X_{eq}^2(\omega)}{R_{eq}^2(\omega)}} \ (\omega_{5th} \leq \omega \leq \omega_t) \right\}. \quad (8)$$

The disclosed filter 320 is composed of five components (first series capacitor $C_1$, first series inductor $L_1$, second parallel capacitor $C_2$, second parallel inductor $L_2$ and damping resistor R). By solving the above five equations, parameters of all filter components can be determined.

Using an example industry case, Table 1 shows that the disclosed filter can achieve a performance comparable to that of the filter package 120 of FIG. 2. Accordingly, the use of non-characteristic filter branches may be eliminated.

TABLE 1

HARMONIC CURRENT FLOWING INTO SYSTEM

| | Harmonic currents as a percentage of the fundamental frequency current (h harmonic order) | | | | | | | | |
|---|---|---|---|---|---|---|---|---|---|
| Option | 5 | 7 | 11 | 13 | 17 | 19 | 23 | 25 | TDD |
| Without Filter | 2.6 | 1.6 | 4.5 | 2.9 | 0.2 | 0.1 | 0.9 | 0.8 | 6.3 |
| With Filter Branch 123 | 4.3 | 8.2 | 1.4 | 1.1 | 0.1 | 0.0 | 0.4 | 0.3 | 9.5 |
| With Filter Branch 121, 122 and 123 | 1.9 | 0.6 | 1.3 | 1.0 | 0.1 | 0.0 | 0.4 | 0.3 | 2.7 |
| With Filter Branch 320 | 3.2 | 2.0 | 1.4 | 0.8 | 0.1 | 0.0 | 0.4 | 0.3 | 4.1 |
| IEEE Harmonic Limitations | 4.0 | 4.0 | 2.0 | 2.0 | 1.5 | 1.5 | 0.6 | 0.6 | 5.0 |

Figure 5:
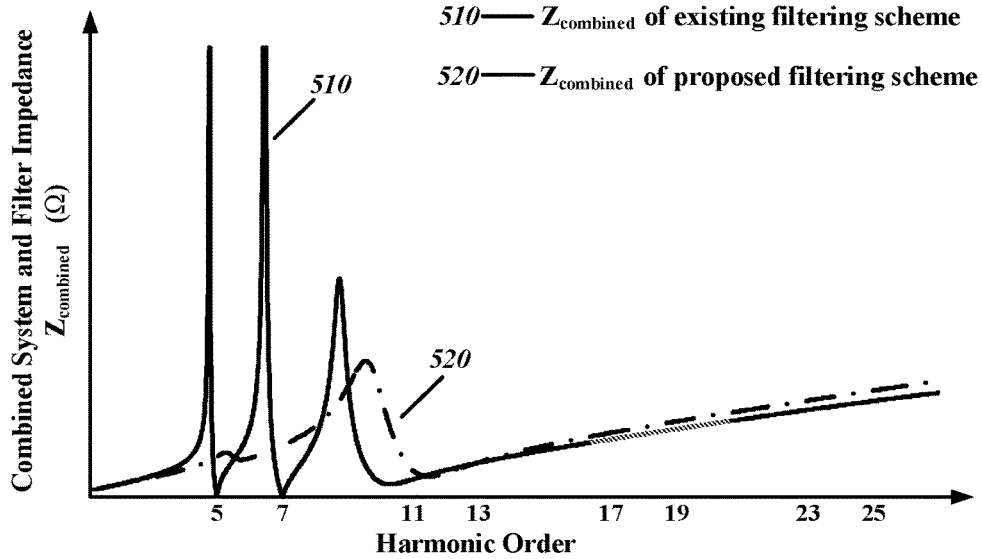
FIG. 5 shows the frequency response diagram of the combined system and filter impedance.

Now referring to impedance curve 510 in FIG. 5 which shows the frequency response of the combined system and filter package 120, as seen by the multipulse converter system. The response shows that the impedances are low at the frequencies to which the filter branches 121, 122, 123 are tuned to. However, the impedance can be quite high between two harmonic frequencies. This implies that the filter package 120 causes a resonance at interharmonics frequencies, although it has avoided resonance at harmonic frequencies. Such an interharmonics resonance can amplify interharmonic components, leading to voltage flicker and other power quality issues.

Now referring to impedance curve 520 in FIG. 5 which shows the frequency response of the combined system and the disclosed filter 320, as seen by the multipulse converter system. This figure reveals that the combined impedance is consistently low at various frequencies. As a result, interharmonics resonance is also eliminated. Accordingly, there may be provided a resonance free impedance profile below the filter tuning frequency to suppress the interharmonic amplification.

Although the example case given is for a 12-pulse system, embodiments of the disclosed filter may also be used for other multipulse converter systems such as the 18-pulse or 24-pulse systems.

Figure 6:
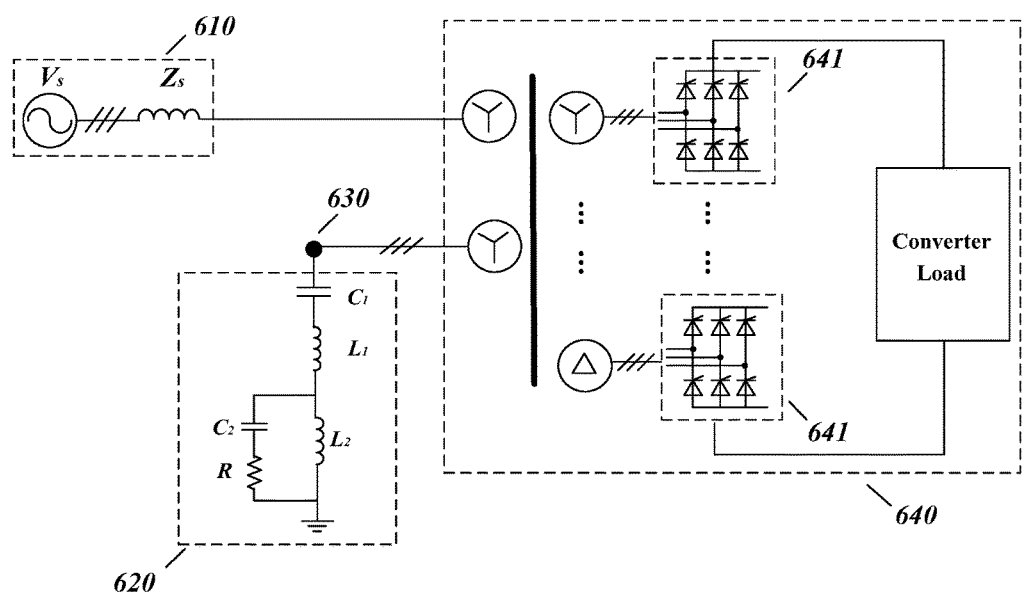
FIG. 6 shows an alternative filter location which is at a transformer tertiary winding.
Figure 7:
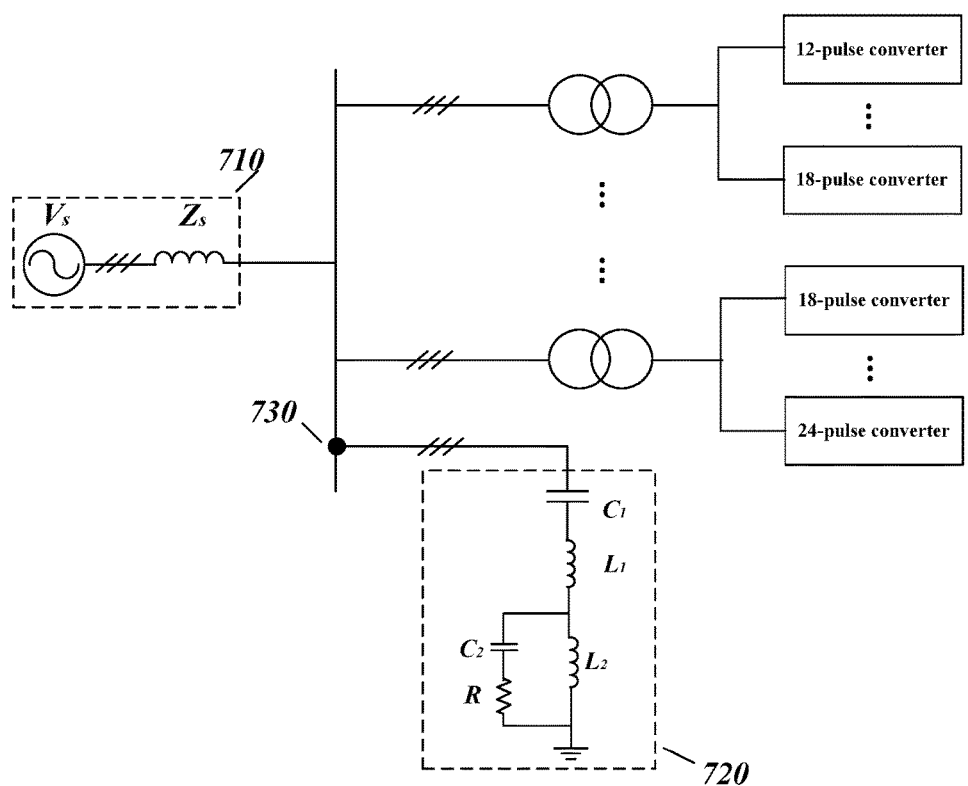
FIG. 7 shows an alternative filter location in an industrial plant with several multipulse converters.

The location of the disclosed filter is not restricted to that shown in FIG. 3. For example, if the transformer connecting power system and the multipulse system has tertiary winding, the tertiary winding can be a candidate location to connect the disclosed filter (as shown in FIG. 6). Using tertiary winding to connect filter package 120 is disclosed in US patent 2010/0118568 A1. An industrial plant may contains several multipulse converter systems, for this case, the disclosed filter 320 can be located at the point of common coupling of the industrial plant as shown in FIG. 7.

The filter is primarily intended for use in three-phase power systems. It can also be used for single-phase power systems.

Embodiments of the filtering scheme may eliminate the use of non-characteristic harmonic filters for multipulse converter systems. This is achieved through the use of a novel characteristic filter that can provide a high resistance below its tuning frequency. This resistance, in turn, damps the aforementioned resonance. As a result, a single filter branch is sufficient for multipulse convert systems.

Immaterial changes may be made to the disclosed filter without departing from what is claimed.

What is claimed is:

1. A filter for a multipulse-converter system that has characteristic harmonic currents, and causes non-characteristic harmonic resonance at harmonic frequencies including a third harmonic frequency, fifth harmonic frequency and a seventh harmonic frequency, the filter comprising:
- a first series capacitor;
- a first series inductor;
- a frequency-dependent impedance block providing high equivalent resistance for damping non-characteristic harmonic resonance, the frequency dependent impedance block including a second capacitor in series with a resistor, and a second inductor in parallel with the second capacitor and the resistor, the frequency-dependent impedance block having a parallel resonance frequency;
- the first series capacitor, first series inductor and the frequency-dependent impedance block being jointly tuned so that the filter has a tuning frequency to filter the characteristic harmonic currents, the filter having an equivalent impedance; and
- wherein the second capacitor has a capacitance and the second inductor has an inductance, the capacitance and inductance being selected so that the parallel resonance frequency is greater than the third harmonic frequency and less than the seventh harmonic frequency; and
- wherein the equivalent impedance of the filter approaches proportionality with frequency for frequencies greater than the tuning frequency;
- each of the first series capacitor, first series inductor, frequency-dependent impedance block being suitable for use in multipulse converter systems.

2. The filter of claim 1 in which the characteristic harmonic currents comprises the $11^{th}$ harmonic or higher.

3. The filter of claim 2 in which the non-characteristic harmonic comprises the $3^{rd}$, $5^{th}$ and $7^{th}$ harmonics.

4. The filter of claim 1 in which the non-characteristic harmonic comprises the $3^{rd}$, $5^{th}$ and $7^{th}$ harmonics.

5. The filter of claim 1 in which the tuning frequency of the filter is selected to be equal to a lowest characteristic harmonic frequency.

6. The filter of claim 1 in which the first series capacitor, first series inductor and the frequency-dependent impedance block are also jointly tuned to minimize harmonic amplification in a frequency range.

7. The filter of claim 1 in which each of the first series capacitor, first series inductor and frequency-dependent impedance block are suitable for use in 12, 18 or 24 pulse converter systems.

8. An apparatus comprising:
a multipulse converter system; and
a filter connected to the multipulse converter system that has characteristic harmonic currents, and causes non-characteristic harmonic resonance at harmonic frequencies including a third harmonic frequency, fifth harmonic frequency and a seventh harmonic frequency, the filter having, a first series capacitor; a first series inductor and a frequency-dependent impedance block providing high equivalent resistance for damping non-characteristic harmonic resonance, the frequency dependent impedance block including a second capacitor in series with a resistor, and a second inductor in parallel with the second capacitor and the resistor, the frequency-dependent impedance block having a parallel resonance frequency;
the first series capacitor, first series inductor and the frequency-dependent impedance block being jointly tuned so that the filter has a tuning frequency to filter the characteristic harmonic currents, the filter having an equivalent impedance;
wherein the second capacitor has a capacitance and the second inductor has an inductance, the capacitance and inductance being selected so that the parallel resonance frequency is greater than the third harmonic frequency and less than the seventh harmonic frequency;
wherein the equivalent impedance of the filter approaches proportionality with frequency for frequencies greater than the tuning frequency; and
each of the first series capacitor, first series inductor, frequency-dependent impedance block being suitable for use in multipulse converter systems.

9. The apparatus of claim 8 in which the multipulse converter system comprises a high voltage direct current transmission system.

10. The apparatus of claim 8 in which the multipulse converter system comprises a variable frequency drive.

11. The apparatus of claim 8 in which the multipulse converter system comprises a 12, 18 or 24 pulse converter system.

* * * * *